United States Patent
Hara et al.

(10) Patent No.: US 9,932,491 B2
(45) Date of Patent: Apr. 3, 2018

(54) METHOD FOR PREPARING EMULSION FOR CATIONIC ELECTRODEPOSITION COATING COMPOSITION IN EMULSIFICATION FIELD AND TRANSPORTING METHOD FOR AMINATED RESIN

(71) Applicant: NIPPON PAINT CO., LTD., Osaka (JP)

(72) Inventors: Takeshi Hara, Osaka (JP); Nobuhiro Miyamae, Osaka (JP); Makoto Andou, Osaka (JP); Masahiko Harada, Osaka (JP); Noriyuki Nakazawa, Osaka (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 169 days.

(21) Appl. No.: 14/666,858

(22) Filed: Mar. 24, 2015

(65) Prior Publication Data
US 2015/0275030 A1    Oct. 1, 2015

(30) Foreign Application Priority Data
Mar. 26, 2014   (JP) ................... 2014-064384

(51) Int. Cl.
*C09D 163/00* (2006.01)
*C08G 59/06* (2006.01)
*C08G 59/14* (2006.01)

(52) U.S. Cl.
CPC ......... *C09D 163/00* (2013.01); *C08G 59/066* (2013.01); *C08G 59/1477* (2013.01)

(58) Field of Classification Search
CPC .................................................. C09D 163/00
See application file for complete search history.

(56) References Cited

U.S. PATENT DOCUMENTS

| | | | | |
|---|---|---|---|---|
| 4,888,244 A | * | 12/1989 | Masubuchi | B05D 7/56 204/486 |
| 5,334,662 A | * | 8/1994 | Ochi | C08G 81/028 428/209 |
| 5,936,012 A | * | 8/1999 | Kaufman | C08G 18/643 523/404 |
| 2009/0056741 A1 | * | 3/2009 | Iida | B41F 35/02 134/1 |
| 2009/0258196 A1 | * | 10/2009 | Nagashima | B41M 5/0023 428/195.1 |
| 2009/0264578 A1 | * | 10/2009 | Minaki | C08G 18/003 524/502 |
| 2011/0027585 A1 | * | 2/2011 | Pritschins | B01F 17/005 428/375 |

FOREIGN PATENT DOCUMENTS

| | | |
|---|---|---|
| JP | 57-16068 | 1/1982 |
| JP | 2010-43189 | 2/2010 |
| JP | 2012-92293 | 5/2012 |

* cited by examiner

*Primary Examiner* — Megan McCulley
(74) *Attorney, Agent, or Firm* — Wenderoth, Lind & Ponack, L.L.P.

(57) ABSTRACT

A method for preparing an emulsion for a cationic electrodeposition coating composition at an emulsification field, wherein the method includes synthesizing a base resin for a cationic electrodeposition coating composition, removing the base resin in a liquid state from a reaction vessel and then changing the resin into a solid state, and optionally, adjusting a size of the resin into an predetermined size, and emulsifying the resin at the emulsification field by adding water and an optional solvent, a neutralizing agent, a curing agent or additives, wherein the base resin is an aminated resin and has a softening point of 20-90° C., and wherein the adjusted shortest size of the base resin is 40 cm or less. Furthermore, the present application relates to a method for transporting a resin for cationic electrodeposition coating composition.

11 Claims, No Drawings

METHOD FOR PREPARING EMULSION FOR CATIONIC ELECTRODEPOSITION COATING COMPOSITION IN EMULSIFICATION FIELD AND TRANSPORTING METHOD FOR AMINATED RESIN

FIELD OF THE INVENTION

This application has priority rights of Japanese patent application NO. 2014-064384 filed Mar. 26, 2014, which is herein incorporated by reference.

The present invention relates to a method for preparing an emulsion for a cationic electrodeposition coating composition at an emulsification field comprising a step of changing a base resin of the emulsion for a cationic electrodeposition coating composition into a solid state, transporting the resin to the emulsification field, and emulsifying the resin at the field. Furthermore, the present invention relates to a transporting method for a solid state base resin.

BACKGROUND OF THE INVENTION

Cationic electrodeposition coating is a coating method performed by immersing the article to be coated in cationic electrodeposition coating composition as a cathode and applying voltage to it. This method can apply a coating to details even if an article to be coated has a complicated shape. In addition, the method can be performed automatically and continuously. Thus, it is widely used practically as the undercoating method for an article to be coated having a large and complicated shape such as the car body of an automobile in particular. Furthermore, the electrodeposition coating can provide a high corrosion resistance to an article to be coated, and is excellent in the protective effect of the article to be coated.

Cationic electrodeposition coating composition is generally obtained by emulsifying or dispersing an aminated resin, a blocked isocyanate curing agent and a pigment in water. Cationic electrodeposition coating composition can form a film by conduction, it is necessary to use water as a solvent, thus, cationic electrodeposition coating composition contains a large amount of water.

In Japan, cationic electrodeposition coating composition is usually prepared by transporting an emulsion for the electrodeposition coating prepared in a paint company to a coating field, and by mixing the emulsion with a pigment dispersion paste and the like in the coating field. However, the above-mentioned emulsion for the electrodeposition coating contains a solvent composed mainly of water. Thus, when transporting it, since most of a transportation weight is water, it is necessary to enlarge transportation equipment, and a transportation cost was expensive. In addition, in order to store or transport the electrodeposition coating in an emulsion state, a strict temperature control was required to ensure emulsion stability. In order to reduce the inconvenience of a cost at the time of the transportation as described-above, it is conceivable to concentrate the emulsion solution. However, the concentration procedure may provide a viscosity rise, thus, the stability of the emulsion may be impaired, and an extra concentration cost may be required.

In addition, when an emulsion for the electrodeposition coating prepared in a domestic is transported to a domestic and international coating field, it is necessary a marine transportation by ships or tankers and/or a land transportation by trains/trucks. Also in this case, it is necessary to transport an emulsion containing large amounts of water as mentioned above with a temperature control, thus, a size and complexity of transportation equipment cannot be avoided, and also it is greatly reflected in a transportation cost. Therefore, an efficiency of transportation is required.

Japanese Patent Kokai Publication No. 2010-43189 (Patent Literature 1) discloses a replenishing coating composition containing a high concentration resin to be replenished to cationic electrodeposition coating composition. This technique is intended to improve the techniques to replenish the film-forming components using a replenishing coating, for a decrease of a film-forming component of cationic electrodeposition coating composition when use it. Also, this technique is intended to change a two-packed type of a replenishing coating into a one-packed type of it. Although this prior art also relates to a transportation point, this prior art does not relate to transportation of an emulsion for the electrodeposition coating, but relate to a replenishing coating. In addition, the replenishing coating also essentially contains a large amount of water.

Japanese Patent Kokai Publication No. 2012-092293 (Patent Literature 2) discloses a pigment dispersed paste of specific formulations. In paragraph [0002] of Patent Literature 2, as problems when transporting it to a coating equipment in overseas, it is described a technology which increases a storage stability of the pigment dispersed paste, since a pigment dispersed paste placed in a drum is in a non-stirring state. This technology does not relate to a transportation of an emulsion for a cationic electrodeposition coating composition, but relates a pigment dispersed paste.

[Patent Literature 1] JP-A-2010-43189
[Patent Literature 2] JP-A-2012-092293

DISCLOSURE OF THE INVENTION

Problems to be Solved by the Invention

An object of the present invention is to make the transportation of an emulsion for a cationic electrodeposition coating composition more efficient and to reduce the transportation costs significantly.

Means for Solving the Problems

The present invention discards the concept of long-distance transportation of the emulsion for a cationic electrodeposition coating composition including water, and the present invention provides a method of emulsification at an emulsification field which is near a coating field. In the method of the present invention, a most important base resin (especially, an aminated resin) of cationic electrodeposition coating composition is transported in a solid state. Thus, a problem occurred by the transportation with water medium have been solved.

Therefore, the present invention provides a method for preparing an emulsion for a cationic electrodeposition coating composition at an emulsification field, wherein the method comprises the steps of:

synthesizing a base resin for a cationic electrodeposition coating composition, changing the resin into a solid state after removing the base resin in a liquid state from a reaction vessel, and if necessary, adjusting a size of the resin into an appropriate size, and, at the emulsification field, emulsifying the resin by adding water and an optional solvent, a neutralizing agent, a curing agent or additives.

Furthermore, the present invention provides a method for preparing an emulsion for a cationic electrodeposition coating composition at an emulsification field, wherein the method comprises the steps of:

synthesizing a base resin for a cationic electrodeposition coating composition, changing the resin into a solid state after removing the base resin in a liquid state from a reaction vessel, and transporting the resin to the emulsification field, then adjusting a size of an aminated resin in the solid state into an appropriate size, and emulsifying the resin by adding water and an optional solvent, a neutralizing agent, a curing agent or additives.

Furthermore, the present invention provides a method for preparing an emulsion for a cationic electrodeposition coating composition at an emulsification field, wherein the method comprises the steps of:

removing the base resin for a cationic electrodeposition in a liquid state from a reaction vessel, then, changing the resin into a solid state, and adjusting the resin to an appropriate size, then, transporting the resin to the emulsification field, and emulsifying the resin by adding water and an optional solvent, a neutralizing agent, a curing agent or additives.

In addition, the present invention provides a method for transporting a base resin for a cationic electrodeposition coating composition, wherein the method comprises a step of:

removing the base resin for a cationic electrodeposition in a liquid state from a reaction vessel, then, changing the resin into a solid state, and, if necessary, adjusting the resin to an appropriate size, and transporting it.

Furthermore, the present invention provides a method for preparing an emulsion for a cationic electrodeposition coating composition at an emulsification field, wherein the method comprises a step of:

transporting a solid state base resin for a cationic electrodeposition coating composition to an emulsification field, then, adjusting the resin into an appropriate size, and emulsifying the resin by adding water and an optional solvent, a neutralizing agent, a curing agent or additives.

The base resin may preferably have a softening point of 20-90° C.

The base resin in the solid state may preferably have a solvent of 10 weight % or less based on the total weight of the base resin.

The adjustment of the size may preferably be performed by pulverization, and the pulverization may be performed at any stage, preferably, may be performed in a step of changing the base resin from a liquid state into a solid state, or immediately after a changing the resin into a solid state, or subsequent necessary steps, or a combination thereof.

An aminated resin may generally be used as the base resin.

An adjusted size of the base resin may preferably be that a shortest size is 40 cm or less.

In the present invention, the base resin (in particular, an aminated resin) of an emulsion for a cationic electrodeposition coating composition is synthesized and solidified. In the solid state, the base resin can be transported as it is, or in a particle state that is pulverized or granulated. In the present invention, the base resin is a solid or particle state, thus, it can be transported in a state that does not contain water. In addition, drawbacks associated with water, which is the control of the increasing size of transport device and transport conditions such as a temperature, become unnecessary. Therefore, the transport of the base resin can also significantly reduce costs.

In the present invention, an emulsion for a cationic electrodeposition coating composition is prepared by transporting to a field a base resin which is in the solid state or is adjusted to an appropriate size, optionally, the size of base resin is further adjusted at the emulsification field, and emulsifying it by adding water and an optional solvent, a neutralizing agent, a curing agent or additives. At the emulsification field, an emulsifying apparatus to form an emulsion for a cationic electrodeposition coating composition is required, but a cost of a transportation of a liquid in the past is greatly reduced. Thus, the reduction of the cost is larger.

DETAILED DESCRIPTION OF THE PREFERRED EMBODIMENTS

Base Resin

The emulsion for a cationic electrodeposition coating composition of the present invention is formed by adding water and a necessary solvent, a neutralizing agent, a curing agent and/or additives to the base resin and emulsifying them. With regard to the base resin of the present invention, the base resin is necessary to become a solid state after synthesis.

The base resin of cationic electrodeposition coating composition is not particularly restricted and may be used known ones. For example, an epoxy resin, an acrylic resins and a polybutadiene resin obtained by adding a cationic functional group such as amines and sulfonium. In particular, an aminated resin is preferred.

Aminated Resin

The aminated resin may be such as an amino group-containing acrylic resin, an amino group-containing ester resin, or an amino group-containing epoxy resin. Furthermore, a cation-modified epoxy resin obtained by a modification of an oxirane ring which is present in the resin skeleton with an organic amine compound is preferred as the aminated resin. In general, a cation-modified epoxy resin is prepared by ring-opening of an oxirane ring which is present in a starting material resin molecule by a reaction with primary amine, secondary amine or tertiary amine and/or amines such as the acid salt thereof. A typical example of the starting material resin is a polyphenol polyglycidyl ether type epoxy resin which is a reaction product of a polycyclic phenol compound such as bisphenol A, bisphenol F, bisphenol S, phenol novolak, cresol novolak and the like with epichlorohydrin. As other examples of the starting material resin, it can be given an oxazolidone ring-containing epoxy resin described in Japanese Patent Kokai Publication No. H05(1993)-306327. These epoxy resins may be prepared by a reaction of a diisocyanate compound, or a reaction of a bis-urethane compound obtained by blocking an isocyanate group of a diisocyanate compound with a lower alcohol such as methanol and ethanol with epichlorohydrin.

The starting material resin can be used with an extension of the chain length by a bifunctional polyester polyol, polyether polyol, bisphenols or dibasic carboxylic acid and the like, prior to the ring-opening reaction of an oxirane ring by amines.

Similarly, prior to the ring-opening reaction of an oxirane ring by amines, in order to adjust the molecular weight or amine equivalent, or to improve the heat flow property, a monohydroxy compound such as 2-ethyl hexanol, nonyl phenol, ethylene glycol mono-2-ethyl hexyl ether, ethylene glycol mono-n-butyl ether or propylene glycol mono-2-ethyl hexyl ether may be introduced into some oxirane rings.

An Example of amines which may be used to ring-opening of the oxirane ring and introduce the amino group includes primary amine, secondary amine, or tertiary amine such as butylamine, octylamine, diethylamine, dibutylamine, methylbutylamine, monoethanolamine, diethanolamine or N-methylethanolamine, triethylamine, N,N-dimethylbenzylamine, N,N-dimethylethanolamine and/or acid salt thereof. Secondary amines having a ketimine blocked primary amino group such as amino-ethylethanolamine methyl isobutyl ketimine or diethylenetriamine diketimine may also be used. These amines are preferable reacted in a stoichiometric amount to the oxirane ring so that all of remaining oxirane ring are ring-opened.

A number average molecular weight of the base resin may preferably be from 1,000 to 10,000. When the number average molecular weight is 1,000 or more, physical properties such as a solvent resistance and a corrosion resistance of an electrodeposited coating film to be obtained are improved. On the other hand, when the number average molecular weight is 10,000 or less, the smoothness of the electrodeposited coating film to be obtained is improved. The number average molecular weight of the base resin may preferably be in the range from 1,600 to 5,000.

In the present specification, the number average molecular weight is the number average molecular weight in terms of polystyrene measured by a gel permeation chromatography (GPC).

Base resin of the present invention requires being into a solid state, after the synthesis and removal in a liquid state from the reaction vessel. An example for forming a solid state is a method including a synthesis at high temperature by controlling the softening point of the base resin, and after the synthesis, the resin is cooled to be into a solid state. As the different way to form a solid state, it is also possible to use a technique such as a vacuum drying or a freeze-drying. As used herein, the term "solid state" refers to a state that shows the behavior similar to a solid or solid. For example, even if the resin having an extremely-high viscosity, when adjustment of a size of the resin is possible, the resin is also included in the solid state.

The base resin of the present invention may preferably have a softening point of 20-90° C., more preferably 60-80° C. If the softening point is lower than 20° C., the base resin removed from a reaction vessel after the reaction may not be in the solid state at room temperature. Thus, it may not be possible to adjust the size since the resin remains high viscosity liquid. By forcibly cooling the base resin having a low softening point, it is possible to adjust a size, but it may be disadvantageous in a cost. On the other hand, if the softening point is higher than 90° C., the resin becomes in the solid state, but it becomes difficult to dissolve in water during an emulsification, and it may have a lot of time for the emulsification. Furthermore, an undissolved resin remains in the emulsion, which may reduce the stability. The softening point can be measured by a thermal flow evaluation apparatus such as a commercially available Flow Tester CFT-500D from Shimadzu Corporation.

For the purpose of an adjustment of a viscosity during synthesis, additives and solvents may be added to the base resin. By adding these, the viscosity decreases, and the synthesis is facilitated.

Base resin may contain a solvent during its preparation. An addition amount of the solvent is usually 10% by weight or less, preferably 4-6% by weight based on the total weight of the base resin in the solid state. Furthermore, if necessary, the resin may also contain additives such as a surfactant, a surface modifier and a viscosity modifier. The addition amount of the additives is 10% by weight or less, preferably 1-6% by weight based on the weight of the aminated resin. When it exceeds 10% by weight, the resin may be hard to become in the solid state, thus, an extraction and pulverization may be difficult.

When the softening point of the base resin is controlled at 20-90° C., the base resin in a liquid state is removed from the reaction vessel at 120-150° C. after synthesis, then, the liquid resin is filled in a container such as a drum remains, then, it is allowed to cool to a temperature below which the resin becomes solid, and it can become in the solid state. Without using the container, it is also possible to solidify the resin by using a belt cooler or a granulator.

Transportation and Size Adjustment of the Base Resin

In the present invention, the base resin is transported in the solid state. For example, when the base resin is filled into above-mentioned drums, the base resin in the solid state may be transported with the one drum. Furthermore, the base resin may be transported by performing a size adjustment such that the granules may become the appropriate size. An adjustment of the size is a concept including both the pulverization and the granulation, and a large one may be pulverized to carry it easily. Also, it is also possible to granulate by cooling the base resin droplets having a predetermined size. Typically, the base resin in the solid state is often used by pulverizing. The adjustment of the size (specifically pulverization or a granulation) may be performed immediately after the preparation of the base resin in the solid state. Furthermore, the adjustment of the size may be performed in a suitable stage before the transportation, or performed at the emulsification field after the transportation. Also, the solid state products are almost pulverized before the transportation, then, transport it, and a final pulverization may be performed after arriving to the emulsification field. The adjusted size of the base resin is that the shortest size is 40 cm or less. The shortest size means the minimum size of the particles. It is also possible that the shortest size of the base resin is more than 40 cm, but usually it may become difficult to dissolve during emulsification. Furthermore, the rest may occur, and an emulsification time may become longer. The present invention only specifies the minimum size, but does not specify the maximum size. This means if the shortest part is 40 cm or less, the longest size may be larger. For example, it is possible that the shortest part is 40 cm and the longest size is 5 m. In granules of the base resin, it is preferred that there are fine particles, in particular the particles having the shortest size of 2 mm or less. When such fine particles are present, they are firstly dissolved at the time of emulsification, then, they act as an auxiliary agent for emulsification, and they facilitate the solubility of the larger particles.

The Pulverization in a size adjustment, it is possible to use a method including a strike by such as a hammer and a fall of the solid products, in addition, to use a commercial grinder (such as an impact type, a compression type and a cutting-type). When it is not possible to pulverize the resin to an interest particle size in one step, it may be pulverized by using a method having two or more stages. The granulation may change small particles into larger particles by using a commercially available granulator.

Measurements of the size at the size adjustment, since it is not required a precision controls, it may be easily measured with the use of such visual and calipers. In addition, the upper limit of the size may be controlled by using a sieve that a hole having an upper limit of the appropriate range is open and by passing the ground material to the sieve. When the lower limit of the size is controlled, the size may be similarly controlled by using a sieve that a hole having a lower limit of the appropriate range is open.

The transportation of the base resin in the solid state may be performed in a variety of ways. The transportation may use any trucks, ships, tankers and a combination thereof. In any of these methods for the transportation, a handling may facilitate since water and solvent is not almost contained in the base resin.

Emulsification Working of the Base Resin at the Emulsification Field

The emulsification of the base resin typically comprises an addition of some of an ion-exchanged water, optional a solvent, a neutralizing agent and additives to an emulsifying tank equipped with a stirrer and heating-cooling equipment, and heating it to a temperature higher than the softening point of the base resin. Then, the solid state base resin which is adjusted the size, as well as an optional solvent, an additive and curing agent are added thereto. Then, the remaining ion-exchanged water is added thereto in a water-in-oil emulsion (W/O type emulsion) state which is obtained by melting the base resin and mixing it; and emulsified by a phase inversion.

In preparation by the emulsification of the emulsion for a cationic electrodeposition coating composition, the base resin is optionally water-solubilized by neutralization using a neutralizing agent. The neutralizing agent used for the neutralization of the base resin includes organic acids such as methanesulfonic acid, lactic acid, dimethylol propionic acid, formic acid, acetic acid and lactic acid, and inorganic acids such as sulfamic acid and nitric acid.

An amount of the neutralizing agent to be used may preferably be in the range of 10-50 mg equivalents (MEQ (A)), based on 100 g of the solid resin content including the base resin and the curing agent. The lower limit may more preferably be 15 mg equivalents, and the upper limit may more preferably be 20 mg equivalents. When the amount of the neutralizing agent is 10 mg equivalents or more, an affinity to water becomes sufficient and a distribution will be good. On the other hand, when the amount of the neutralizing agent is 50 mg equivalents or less, the quantity of electricity required for precipitation becomes appropriate, thus, a deposition property and a throwing property are good. The "MEQ (A)" as used herein, which is an abbreviation for "mg equivalent (acid)", means the total of mg equivalents of all acids required for neutralization per 100 g of the solid content of the coating. The MEQ (A) is determined by measuring the amount of the acid contained in the electrodeposition coating composition by the potentiometric titration with 1/10N NaOH solution, after 10 g of the electrodeposition coating composition precisely weighed is dissolved in about 50 ml of solvent (THF: tetrahydrofuran).

The solvent used during the emulsification includes ethylene glycol monobutyl ether, ethylene glycol mono hexyl ether, ethylene glycol mono-ethylhexyl ether, propylene glycol monobutyl ether, dipropylene glycol monobutyl ether, propylene glycol monophenyl ether and the like.

The usage amount of solvent during the emulsification may be usually 0.5-6.0% by weight, preferably 1-4% by weight, combined with the amount of solvent contained in the aminated resin, relative to the total weight of the obtained emulsion. If the weight is less than 0.5% by weight, the smoothness of the coating film may be impaired and/or an insufficient thickness of the coating film may occur. If the weight is more than 6.0% by weight, a throwing power reduction and a thickness excessive may occur.

As the additives used during the emulsification, conventional coating composition additives such as dry inhibitors, surfactants such as defoaming agents, viscosity modifiers such as acrylic resin fine particles, cissing inhibitors, inorganic rust preventives such as vanadium salts, copper, iron, manganese, magnesium and calcium salt may be optionally added. In addition, other than these, known additives according to the purpose, such as auxiliary complexing agents, buffering agents, smoothing agents, stress-relaxing agents, gloss agents, semi-gloss agents, antioxidants and UV absorbers may be added.

The usage amount of the additives at the time of the emulsification is usually 0-2% by weight, preferably 0.3-1.0% by weight based on the total weight of the obtained emulsion.

The curing agent used for the emulsion for the electrodeposition coating composition is usually a blocked isocyanate curing agent. The blocked isocyanate curing agent may be prepared by blocking polyisocyanate with a blocking agent.

An example of the polyisocyanate includes aliphatic diisocyanates such as hexamethylene diisocyanate (including a trimer), tetramethylene diisocyanate, trimethylhexa methylene diisocyanate and the like, alicyclic polyisocyanates such as isophorone diisocyanate, 4,4'-methylenebis (cyclohexylisocyanate) and the like, as well as aromatic diisocyanates such as 4,4'-diphenylmethane diisocyanate, tolylene diisocyanate, xylylene diisocyanate and the like.

Examples of the blocking agents include: monovalent alkyl (or aromatic) alcohols, such as n-butanol, n-hexyl alcohol, 2-ethylhexanol, lauryl alcohol, phenol carbinol, methyl phenyl carbinol and the like; cellosolves, such as ethylene glycol monohexyl ether, ethylene glycol mono-2-ethylhexyl ether and the like; polyether type both terminal diols such as polyethylene glycol, polypropylene glycol, polytetramethylene ether glycol and the like; polyester type both terminal polyols obtained from diols such as ethylene glycol, propylene glycol and 1,4-butanediol with dicarboxylic acids such as oxalic acid, succinic acid, adipic acid, suberic acid, sebacic acid and the like; phenols, such as para-t-butyl phenol, cresol and the like; oximes, such as dimethyl ketoxime, methylethyl ketoxime, methyl isobutyl ketoxime, methyl amyl ketoxime, cyclohexanone oxime and the like; and lactams represented by ε-caprolactam, γ-butyrolactam and the like may preferably be used.

A blocked ratio of the blocked isocyanate curing agent may preferably be 100%. According to this, there is an advantage that the storage stability of the emulsion for a cationic electrodeposition coating composition is improved.

The emulsion for a cationic electrodeposition coating composition which is obtained by the preparation method performed at an emulsification field of the present invention does not differ in the performance from an emulsion for a cationic electrodeposition coating composition which is prior art and transported in the liquid state. It is because that the base resin in the solid state is merely transported and the resin is emulsified at the field, thus, the component contained in the emulsion for a cationic electrodeposition coating composition have not been changed.

The method for preparing the emulsion for a cationic electrodeposition coating composition at an emulsification field of the present invention may be performed in the following two steps:

as a previous step, the transportation method of the base resin, which merely performs a solidification and transportation of the base resin; and as a later step, the preparation step of the emulsion at the emulsification field where the size adjustment and emulsification of the solid state base resin is performed.

Each technology becomes available on the basis that the base resin is in the solid state. Thus, this is a new transportation method only for the base resin for a cationic electrodeposition coating composition. It may be possible to improve an efficiency of the transportation by performing a coarse ground before the transportation of the solid state base resin. In addition, it also may be possible to pulverize completely it to the size of the final stage before the transportation.

EXAMPLES

The present invention will be described in more detail by way of examples, but the present invention is not limited to these examples. In the examples, "parts" and "%" are based on the weight unless otherwise indicated.

Preparation Example 1-1

Preparation of Amine-Modified Epoxy Resin (Aminated Resins) A

Into a reaction vessel equipped with a stirring device, a condenser tube, a nitrogen gas inlet and a thermometer, 1760 kg of an epoxy resin having an epoxy equivalent of 188 (available from Dow Chemical Company as "DER331J"), obtained by synthesizing from bisphenol A and epichlorohydrin, 700 kg of bisphenol A, 188 kg of 2-ethyl hexanoic acid, and 4 kg of dimethyl benzyl amine were charged. The reaction was performed at 140° C., and the reaction was continued until 1420 of the epoxy equivalent was obtained.

After cooling, 112 kg of N-methyl ethanolamine and 88 kg of ketimine compound of amino ethyl ethanolamine (81% by weight/MIBK solution) were added and the reaction was performed at 160° C. for 2 hours. Then, 123 kg of butylcellosolve was added and obtained an amine-modified epoxy resin in the liquid state.

The obtained amine-modified epoxy resin in the liquid state was charged into a 200 L vessel (a commercial drum), and the resin was changed into the solid state by cooling to room temperature. The obtained amine-modified epoxy resin in the solid state had a softening point of 70° C., and the amount of the solvent relative to the weight of the amine-modified epoxy resin was 4.7% by weight.

Preparation Example 1-2

Preparation of Amine-Modified Epoxy Resin (Aminated Resin) B

Except for using 500 kg of butyl cellosolve, a resin was prepared in the same manner as described in Preparation Example 1-1. The resin having a softening point of 15° C. and having a solvent amount of 15.4% was obtained. This resin did not become the solid state.

Preparation Example 1-3

Preparation of Amine-Modified Epoxy Resin (Aminated Resin) C

Except for using 150 kg of bisphenol A and 885 kg of 2-ethyl hexanoic acid, a resin was prepared in the same manner as described in Preparation Example 1-1. The resin having a softening point of 15° C. and having a solvent amount of 4.5% was obtained. This resin did not become the solid state.

Preparation Example 1-4

Preparation of Amine-Modified Epoxy Resin (Aminated Resin) D

Except for using buthylcellosolve, a resin was prepared in the same manner as described in Preparation Example 1-1. The resin having a softening point of 102° C. and having a solvent amount of 0.6% was obtained.

Preparation Example 1-5

Preparation of Amine-Modified Epoxy Resin (Aminated Resin) E

Except for using 250 kg of buthylcellosolve, a resin was prepared in the same manner as described in Preparation Example 1-1. The resin having a softening point of 28° C. and having a solvent amount of 8.6% was obtained.

Preparation Example 2

Preparation of a Blocked Isocyanate Curing Agent

Into a reaction vessel, 1350 kg of diphenylmethane diisocyanate (Sumidur 44V20, isocyanate group content (NCO content) 31%: from Sumitomo Bayer Urethane Co., Ltd.) was charged and heated it to 120° C., then 2.5 kg of dibutyl tin dilaurate was added. A solution of 226 kg of ε-caprolactam dissolved in 944 kg of butylcellsolve was dropped thereto at 120° C. over 2 hours. In addition, after the heating at 120° C. for 4 hours, it was confirmed that absorption based on an isocyanate group disappeared in IR spectrum measurement. Thereby, the blocked isocyanate curing agent having 99% of a solid mass concentration was obtained.

Preparation Example 3

Preparation of a Pigment Dispersing Resin

Into a reaction vessel equipped with a stirring device, a condenser tube, a nitrogen gas inlet and a thermometer, 222.0 parts of isophorone diisocyanate (hereinafter, referred to as IPDI) was charged and after diluted with 39.1 parts of MIBK, 0.2 part of dibutyltin dilaurate was added. Then, the reaction mixture was heated to 50° C., and 131.5 parts of 2-ethyl hexanol was dropped under dry nitrogen atmosphere over 2 hours with stirring. Reaction temperature was kept at 50° C. by cooling as necessary. As the result, 2-ethyl hexanol half blocked IPDI (resin solid content: 90.0%) was obtained.

To a suitable reaction vessel, 87.2 parts of dimethylethanolamine, 117.6 parts of 75% aqueous solution of lactic acid, and 39.2 parts of ethylene glycol mono-n-butyl ether were added sequentially, then, the reaction mixture was stirred at 65° C. for about half an hour to prepare a quaternarizing agent.

Subsequently 710.0 parts of DER-331J and 289.6 parts of bisphenol A were charged into an appropriate reaction vessel. The reaction mixture was heated to 150 to 160° C. under nitrogen atmosphere, initial exothermic reaction was occurred. The reaction mixture was reacted at 150 to 160° C. for about 1 hour, the reaction mixture was then cooled to 120° C., and 498.8 parts of the previously prepared 2-ethyl hexanol half-blocked IPDI (MIBK solution) was added.

The reaction mixture was held at 110 to 120° C. for about 1 hour, 463.4 parts of ethylene glycol mono-n-butyl ether were added, the mixture was cooled to 85 to 95° C., homogenized, and 196.7 parts of the previously prepared quaternarizing agent was added thereto. The reaction mixture was held at 85 to 95° C. until the acid value became 1, 964 parts of deionized water were added thereto, and a pigment dispersing resin having quaternary ammonium salt moiety (resin solid content: 50%) was obtained.

Preparation Example 4

Preparation of Pigment Dispersion Paste

Into a sand pulverization mill, 120 parts of the pigment dispersing resin obtained in Preparation example 3, 2.0 parts of carbon black, 100.0 parts of kaolin, 80.0 parts of titanium dioxide, 18.0 parts of aluminum phosphomolibudate and 221.7 parts of ion-exchange water were charged and they were dispersed until particle size was not more than 10 μm, to obtain a pigment dispersion paste (solid content: 48%).

Example 1

Preparation of a Resin Emulsion of an Electrodeposition Coating

Into an emulsification device, 2,000 kg of ion-exchanged water and 23 kg of formic acid were charged and kept at 80° C. Then, 2,350 kg (solid conversion) of the aminated resin A obtained in the Preparation Example 1-1 was pulverized by a hammer so that the shortest size of the resin was 40 cm, slowly added thereto, and the resin were dispersed over 6 hours. Then, 400 kg (solid conversion) of the blocked isocyanate curing agent obtained from Preparation example 2 was added, furthermore, 1000 kg of ion-exchanged water was added thereto, and a resin emulsion for a cationic electrodeposition coating composition (solid content: 40%) was obtained by phase inversion. A particle size of the emulsion was measured by laser light scattering, and the result of a volume average particle diameter was 160 nm. A particle size measurement of the emulsion was used Laser Doppler particle size analyzer (Microtrac UPA150, manufactured by Nikkiso Co., Ltd.)

Preparation of Cationic Electrodeposition Coating Composition and Cured Electrodeposition Coating Film The obtained resin emulsion for a cationic electrodeposition coating composition of 375 parts, 135 parts of the pigment-dispersed paste prepared in Preparation Example 4, and 490 parts of ion-exchanged water were added to prepare a cationic electrodeposition coating composition. A solids content of the obtained cationic electrodeposition coating composition was 20%.

An electrodeposition coating was performed by immersing a steel plate (JIS G3134, SPCC-SD) treated with zinc phosphate (Surf dine SD-5000, available from Nippon Paint Co., Ltd.) as a cathode in the obtained cationic electrodeposition coating composition, and by applying conditions at a bath temperature of 28° C., at voltage of 200 V and for 180 seconds. Then the steel plate was washed with water, and baked for at 160° C. for 25 minutes, and cooled in the air, to obtain a cured electrodeposition coating film having a film thickness of 15 μm.

With regard to above-mentioned resin emulsion for a cationic electrodeposition coating composition, even if it was left to stand and stored for three months at room temperature, a separation and sedimentation of the solids did not occurred. Also the obtained film properties (salt spray resistance, water resistance and chemical resistance; JIS K 5600) were evaluated, these properties were compared with the properties of the electrodeposition coating before storage, and these properties was almost the same.

Example 2

Except for using the pulverized resin of the aminated resin A which was obtained from the Preparation example 1-1 after 1 month storage at 60° C., the examination was performed in the same manner as in Example 1. The emulsion and coating both had an equivalent performance as shown in Example 1. By storing for one month at 60° C., a transportation state was reproduced.

Example 3

Except that the aminated resin A obtained from the preparation Example 1-1 was stored at 60° C. for one month and it was pulverized so that the shortest size of the resin was 40 cm, the examination was performed in the same manner as in Example 1. The emulsion and coating both had an equivalent performance as shown in Example 1.

Example 4

Except that the molten resin of the aminated resin A which was obtained from the preparation Example 1-1 was formed into a solid state resin particle having 1 cm of the shortest size by using a roll-drop granulator, the examination was performed in the same manner as in Example 1. The emulsion and coating both had an equivalent performance as shown in Example 1. The roll-drop type granulator is a granulator usually having a rotating drum with projections, wherein the granulator has a mechanism that a molten material is scraped at the tip of the projections, and the molten material is dropped on a plate with centrifugal force by the rotating drum and/or an action of gravity.

Example 5

Except for using the aminated resin E obtained from Production Example 1-5, the examination was performed in the same manner as in Example 1. Except that pulverization time was extended to 1.5 times and the particle size of the emulsion became 200 nm, an equivalent performance as shown in Example 1 was obtained.

Example 6

Except that the aminated resin A was used and the resin was pulverized 79 cm of a maximum size, the examination was performed in the same manner as in Example 1. The resin did not fully dispersed even if it took 24 hours, and a resin emulsion of cationic electrodeposition coating composition was not obtained. However, the dispersion was continued for 48 hours, the resin emulsion of cationic electrodeposition coating composition was obtained. The performance of the obtained coating was slightly inferior.

Example 7

Except for using the aminated resin D obtained from Production Example 1-4, the examination was performed in the same manner as in Example 1. The resin is not fully dispersed even if it took 24 hours, and a resin emulsion was not obtained. However, the dispersion was continued for 48 hours, the resin emulsion of cationic electrodeposition coating composition was obtained. The performance of the obtained coating could not be ensured an adequate performance.

Reference Example 1

In Example 1, instead of the use of the aminated resin A of Preparation Example 1 that was pulverized after the solidification and added to water, a liquid state resin which did not change into the solid state was kept at 120° C., and the resin was added to water. Except this, the examination was performed in the same manner as in Example 1. An equivalent performance shown in Example 1 was obtained.

Comparative Example 1

In Reference Example 1, the cationic electrodeposition coating resin emulsion of the aminated resin A was stored directly at 60° C. for one month. Some of the resin content was precipitated. Although the cationic electrodeposition coating resin emulsion was obtained, the coating film obtained from it was not possible to ensure adequate performance.

Comparative Example 2

It was attempted to pulverize the aminated resin B obtained from Production Example 1-2 at room temperature, but it was not possible to pulverize the resin since the resin was soft.

Comparative Example 3

It was attempted to pulverize the aminated resin C obtained from Production Example 1-3 at room temperature, but it was not possible to pulverize the resin since the resin was soft.

INDUSTRIAL APPLICABILITY

The present invention relates to a method for preparing an emulsion for a cationic electrodeposition coating composition at an emulsification field. In more detail, when the cationic electrodeposition coating emulsion is delivered from the coating factory to a distant coating field such as overseas, the present invention has been largely improved an transportation efficiency by the following steps:

the base resin which is the main component (in particular, the aminated resin) is changed into a solid state; transports it, if necessary, after the adjustment of the particle size; at the emulsification field where is more closely to a coating field, water and/or a neutralizing agent is added to the resin and it is emulsified; and then it is delivered to the coating field. The conventional emulsion for a cationic electrodeposition coating composition is transported in a liquid that was emulsified base resin in an aqueous solvent, thus, the aqueous medium also had to be transported. However, in the present invention, the base resin is transported in the solid state, and, the emulsion for a cationic electrodeposition coating composition is prepared by using water and other additives at the emulsification field. Therefore, such equipment which is required to transport the aqueous solvent can be greatly simplified. The present invention can also greatly improve the transport efficiency of the emulsion for a cationic electrodeposition coating composition to the domestic and foreign countries.

What is claimed is:

1. A method for preparing an emulsion for a cationic electrodeposition coating composition at an emulsification field comprising a step of synthesizing a base resin for a cationic electrodeposition coating composition, removing the base resin in a liquid state from a reaction vessel and then changing the resin into a solid state, and, optionally adjusting a size of the resin into a predetermined size, and, at the emulsification field, emulsifying the resin by adding water and an optional solvent, a neutralizing agent, a curing agent or additives
    wherein the base resin is an aminated resin and has a softening point of 20-90° C., and
    wherein, when the aminated resin has been adjusted, the aminated resin has an adjusted shortest size of 40 cm or less.

2. The method for preparing an emulsion for a cationic electrodeposition coating composition at an emulsification field according to claim 1, wherein the aminated resin in a solid state has a solvent of 10 weight % or less based on the total weight of the aminated resin.

3. The method for preparing an emulsion for a cationic electrodeposition coating composition at an emulsification field according to claim 1, wherein an adjustment of the size is performed by pulverization or granulation, wherein the adjustment of the size is performed in a step of changing the base resin from a liquid state into a solid state, or immediately after the aminated resin is changed into a solid state, or subsequent steps, or a combination thereof.

4. The method for preparing an emulsion for a cationic electrodeposition coating composition at an emulsification field according to claim 1, wherein the resin is transported in a solid state or after adjusting a size of the resin.

5. A method for preparing an emulsion for a cationic electrodeposition coating composition at an emulsification field comprising a step of synthesizing an aminated resin for a cationic electrodeposition coating composition, removing the aminated resin in a liquid state from a reaction vessel and then changing the aminated resin into a solid state, and transporting the aminated resin to the emulsification field, then adjusting a size of the aminated resin in a solid state into a predetermined size, and emulsifying the aminated resin by adding water and an optional solvent, a neutralizing agent, a curing agent or additives,
    wherein the aminated resin has a softening point of 20-90° C., and
    wherein the aminated resin has an adjusted shortest size of 40 cm or less.

6. A method for preparing an emulsion for a cationic electrodeposition coating composition at an emulsification field comprising a step of removing a base resin for a cationic electrodeposition coating composition in a liquid state from a reaction vessel, then, changing the resin into a solid state, and adjusting the resin to a predetermined size, transporting the resin to the emulsification field, and emulsifying the resin by adding water and an optional solvent, a neutralizing agent, a curing agent or additives, wherein the base resin is an aminated resin and has a softening point of 20-90° C., and wherein the aminated resin has an adjusted shortest size of 40 cm or less.

7. A method for transporting a base resin for a cationic electrodeposition coating composition comprising a step of removing a base resin for a cationic electrodeposition coating composition in a liquid state from a reaction vessel, then, changing the resin into a solid state, and, optionally adjusting the resin to a predetermined size, and transporting it, wherein the base resin is an aminated resin and has a softening point of 20-90° C., and wherein, when the aminated resin has been adjusted, the aminated resin has an adjusted shortest size of 40 cm or less.

8. The method for transporting a base resin for a cationic electrodeposition coating composition according to claim 7, wherein the animated resin in a solid state has the solvent of 10 weight % or less based on the total weight of the animated resin.

9. The method for transporting a base resin for a cationic electrodeposition coating composition according to claim 7, wherein an adjustment of the size is performed by pulverization or granulation, wherein the adjustment of the size is performed in a step of changing the animated resin from a liquid state into a solid state, or immediately after the resin is changed into a solid state, or subsequent steps, or a combination thereof.

10. A method for preparing an emulsion for a cationic electrodeposition coating composition at an emulsification field comprising a step of transporting a solid state base resin for a cationic electrodeposition coating composition to an emulsification field, then, adjusting the resin into a predetermined size, and emulsifying the resin by adding water and an optional solvent, a neutralizing agent, a curing agent or additives, wherein the base resin is an aminated resin and has a softening point of 20-90° C., and wherein the aminated resin has an adjusted shortest size 40 cm or less.

11. The method for preparing an emulsion for a cationic electrodeposition coating composition at an emulsification field according to claim 10, wherein the animated resin in a solid state comprises a solvent of 10 weight % or less based on the total weight of the animated resin.

* * * * *